United States Patent [19]
Ripley

[11] 3,880,631
[45] Apr. 29, 1975

[54] METHOD OF IDENTIFYING CHEMICALLY TEMPERED OPHTHALMIC LENSES
[75] Inventor: Donald M. Ripley, Elmira, N.Y.
[73] Assignee: Corning Glass Works, Corning, N.Y.
[22] Filed: Nov. 23, 1973
[21] Appl. No.: 418,661

[52] U.S. Cl. ............... 65/30; 351/51; 351/159; 117/37 R; 117/124 B
[51] Int. Cl. ............................... G02b 1/10
[58] Field of Search ......... 351/159, 174; 117/124 B, 117/37 R; 423/367

[56] References Cited
UNITED STATES PATENTS
2,354,772  8/1944  Prance ............................... 351/174
3,094,379  6/1963  Cambi ............................... 423/367

Primary Examiner—Eli Lieberman
Attorney, Agent, or Firm—Kees van der Sterre; Clinton S. Janes, Jr.; Clarence R. Patty, Jr.

[57] ABSTRACT

Ophthalmic lenses to be subjected to chemical tempering are provided with a prussian blue edge marking prior to the tempering process. After tempering, the characteristic yellow color of the edge marking provides a ready means of determining that the lens has been subjected to chemical tempering.

4 Claims, 3 Drawing Figures

PATENTED APR 29 1975                3,880,631

METHOD OF IDENTIFYING CHEMICALLY TEMPERED OPHTHALMIC LENSES

BACKGROUND OF THE INVENTION

Recent Federal regulations provide that all prescription and non-prescription ophthalmic lenses sold in the United States be sufficiently strong to resist breakage under the impact of a ⅝-inch steel ball dropped on the convex face of the lens from a height of 50 inches. For presently-available glass ophthalmic lenses of conventional thickness, the attainment of a degree of impact strength sufficient to enable a lens to pass this test requires chemical or thermal tempering after prescription grinding, in order to provide surface compressive stress layers on the lens surfaces which aid in resisting the stresses of impact.

The presently preferred method of strengthening ophthalmic lenses is chemical tempering, also commonly referred to as ion exchange strengthening. In one common method, the lenses are contacted with a source of exchangeable alkali metal ions such as a molten salt bath containing $KNO_3$ or some other alkali metal salt, and an ion exchange reaction occurs which strengthens the glass. Smaller alkali metal ions in and near the surface of the lens are exchanged for larger alkali metal ions from the bath which enter sites in the glass vacated by the smaller ions, producing compressive stresses in the surfaces of the lens. These compressive stresses are permanent at normal use temperatures and substantially increase the resistance of the lens to breakage in use. Typically, lithium-containing glasses are treated with sodium or potassium salts while sodium-containing glasses are treated with potassium salts to obtain the desired strengthening.

With the increasingly widespread use of chemical tempering processes to provide the degree of impact strength required in ophthalmic lenses, demand has grown for a simple and effective means for determining whether or not a lens has in fact been chemically tempered. Wholesale lens finishers handle large numbers of lenses, and which each finished lens must pass a ball drop test prior to sale in a pair of glasses, ball drop testing does not provide an economical means of identifying unstrengthened lenses because failure necessitates replacement of the lens.

Polarized light provides a means of determining tempering stresses in glass bar samples or air-tempered lenses; however, ophthalmic lenses do not have a configuration which permits ready identification of chemically-stressed lenses using this technique.

What is therefore desired is an economical means of distinguishing chemically-tempered ophthalmic lenses from untempered lenses which is both simple and effective.

SUMMARY OF THE INVENTION

I have now discovered a method of marking ophthalmic lenses in which the color of the marking readily indicates whether or not the lens has been chemically tempered. A coating containing a prussian blue indicator in an amount sufficient to produce a blue coloration therein is applied to at least a portion of the lens prior to chemical tempering. In the course of subsequent tempering with a molten salt bath in the conventional manner, the color of the indicator changes from blue to yellow. Thereafter, the presence of the yellow coloring in the coating evidences the fact that the lens has been subjected to chemical tempering.

This identification method is advantageous because the prussian blue indicator does not interfere with the ion exchange strengthening process of chemical tempering, which would result in low-stress surface regions in the glass. Nor does it introduce surface defects into the glass surface which could cause strength losses. Finally, the effectiveness of the method is essentially independent of the composition of the glass.

While the bulk of the yellow coloration resulting from chemically tempering is physically removable from the glass by washing or wiping, the iron component of the prussian blue indicator produces a permanent yellow stain in the glass. Hence, it is normally desirable that coating of the refractive surfaces of the lens be minimized, and application of the coating to the ground edge portions of the lens is therefore preferred.

Of course, the identification method of the invention may also be used with other glass articles where a simple method of indicating chemical tempering history is desired.

DETAILED DESCRIPTION OF THE INVENTION

Figure 1:
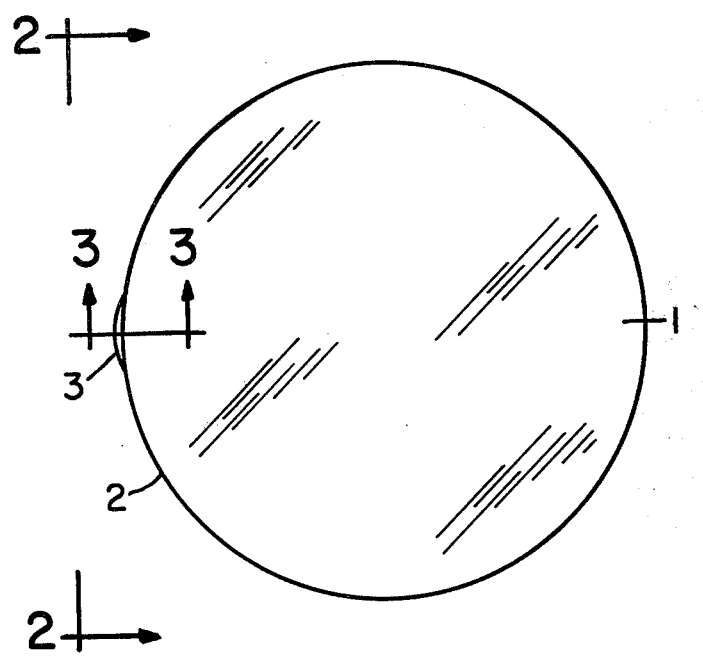
FIG. 1 of the DRAWING is a plan elevational view of an ophthalmic lens 1 having an edge portion 2 supporting on a portion thereof a coating 3 comprising a prussian blue indicator.
Figure 2:
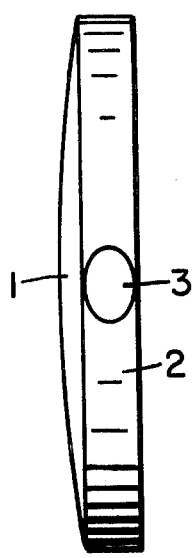
FIG. 2 is a side view of ophthalmic lens 1 along the line 2—2 of FIG. 1 showing the coating comprising the prussian blue indicator 3 on the edge portion 2.
Figure 3:
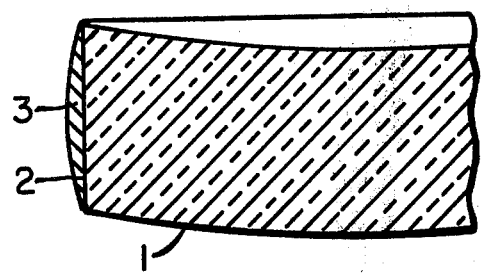
FIG. 3 is an enlarged cross-sectional view along line 3—3 of FIG. 1 showing the disposition of the prussian blue-containing coating 3 on the edge portion 2 of lens 1.

Prussian blues are normally characterized as complex ferric salts of potassium ferrocyanide, typically prepared by the precipitation of potassium iron cyanide compounds from aqueous solutions with ferrous sulfate. The form of prussian blue employed in marking according to the present invention is not critical. The so-called soluble forms, consisting of the compound $KFe[FeCN_6]$ in various stages of hydration, are readily available and are therefore preferred.

The quantity of prussian blue present in the coating to be applied to the lens edge is likewise not critical, provided a sufficient quantity is present to provide a readily-identifiable blue color. Prussian blue may be directly applied as an aqueous paste or slurry so that the resulting coating is composed essentially entirely of the indicator compound. On the other hand, the prussian blue may comprise a relatively minor (but visually identifiable) constituent of a more complex coating system, or it may be applied using other vehicles such as wax or squeegee oils. The medium employed as a carrier for the indicator may be selected to maximize the durability of the coating prior to chemical tempering, or it may be selected with regard to other considerations not related to the function of the indicator.

Regardless of the particular composition of the lens coating to be used as a carrier for the indicator compound, exposure to a source of exchangeable alkali metal ions at the temperatures typically employed for chemically tempering ophthalmic lenses (usually in excess of 350°C.) results in the decomposition of the indicator to form a yellow or yellow-orange residue which clearly indicates the tempering history of the lens. The yellow color is attributed to the presence of iron oxide ($Fe_2O_3$) in the residue.

The invention may be further understood by reference to the following detailed example.

EXAMPLE

A solution consisting of 0.381 grams of $FeSO_4 \cdot 7H_2O$ in 6 grams of water is mixed with a solution consisting of 0.3 grams of $K_3[Fe(CN)_6]$ in 6 grams of water and a deep blue precipitate consisting of hydrated potassium ferric ferrocyanide ($FeK[Fe(CN)_6]$) is formed. This precipitate is separated from its supernatant liquid and applied as a paste to the edges of eight ophthalmic lenses and three glass stress bars, all composed of sodium-containing white ophthalmic crown glass of conventional composition. The paste forms a blue coating on the glass articles after drying in air.

The glass articles marked as described are subjected along with eight unmarked lenses and six unmarked stress bars to a chemical tempering process wherein they are immersed in a bath of molten $KNO_3$ at 460°C. for 16 hours. In the course of this immersion, sodium ions leave the glass and are replaced by potassium ions from the bath, producing compressive stresses in the surface layers of the glass articles.

After removal from the salt bath, all of the glass articles are examined and characteristic yellow markings are observed on the three stree bars and six ophthalmic lenses which have been provided with the prussian blue-containing coating prior to the chemical tempering treatment. On the other hand, the tempering history of the unmarked bars and lenses cannot be determined by simple visual inspection.

All of the stress bars, both marked and unmarked, are then examined to determine the effects of the presence of a prussian blue coating during tempering on the stress distribution and strength of the product. Stresses and stress distribution in the bars are determined using conventional polarimetry techniques, and strengths are evaluated by modulus of rupture testing in the well-known manner. The results of this testing are set forth in the TABLE below, wherein central tension refers to the stress in the central regions of the bar and depth of layer refers to the depth of thickness of the compressively-stressed surface layer formed on the bar by the tempering process.

TABLE

A. MARKED BARS (Prussian Blue)

| Sample No. | Central Tension (kg./mm.) | Depth of Layer (inch) | Modulus of Rupture (psi) |
|---|---|---|---|
| 1 | 1.91 | .0045 | 50,900 |
| 2 | 1.78 | .0048 | 43,900 |
| 3 | 1.86 | .0044 | 50,600 |

B. UNMARKED BARS

| Sample No. | Central Tension (kg./mm.) | Depth of Layer (inch) | Modulus of Rupture (psi) |
|---|---|---|---|
| 1 | 1.86 | .0042 | 51,100 |
| 2 | 1.78 | .0044 | 50,300 |
| 3 | 1.89 | .0044 | 49,500 |
| 4 | 1.88 | .0043 | 47,300 |
| 5 | 1.91 | .0043 | 48,600 |
| 6 | 1.91 | .0042 | 49,300 |

From the above data it can be seen that there is no significant difference in stress, stress distribution, or strength between marked and unmarked glass articles. It has therefore been concluded that prussian blue-containing coatings do not interfere with the ion exchange strengthening process and do not introduce weakening flaws in the glass surface through contact therewith at elevated temperatures. These coatings accordingly provide a simple, non-destructive means for distinguishing lenses which have been chemically tempered from lenses which have not yet been subjected to a chemical tempering process.

I claim:

1. In a method for chemically-tempering an ophthalmic lens which comprises exposure of the lens to a source of exchangeable alkali metal ions at a temperature in excess of 350°C., the improvement which comprises:

applying to at least a portion of the lens prior to exposure to the source of exchangeable alkali ions a coating containing a prussian blue indicator.

2. A method according to claim 1 wherein the coating is applied to at least a portion of the ground edge of the ophthalmic lens.

3. A method according to claim 2 wherein the prussian blue indicator is a hydrated potassium ferric ferrocyanide.

4. A method according to claim 3 wherein the coating consists essentially of potassium ferric ferrocyanide and water.

* * * * *